United States Patent
Utin

(10) Patent No.: US 8,001,376 B2
(45) Date of Patent: *Aug. 16, 2011

(54) FIXED CLIENT IDENTIFICATION SYSTEM FOR POSITIVE IDENTIFICATION OF CLIENT TO SERVER

(75) Inventor: Daniil Utin, Needham, MA (US)

(73) Assignee: Cambridge Interactive Development Corp., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/364,816

(22) Filed: Feb. 3, 2009

(65) Prior Publication Data

US 2009/0144555 A1     Jun. 4, 2009

Related U.S. Application Data

(63) Continuation of application No. 10/532,542, filed as application No. PCT/US03/33509 on Oct. 23, 2003, now Pat. No. 7,487,350.

(60) Provisional application No. 60/421,285, filed on Oct. 25, 2002.

(51) Int. Cl.
*H04L 9/00* (2006.01)
*H04L 9/32* (2006.01)
*G06F 11/30* (2006.01)
*G06F 12/14* (2006.01)
*G06F 7/04* (2006.01)
*G06F 17/30* (2006.01)
*G06K 9/00* (2006.01)
*H03M 1/68* (2006.01)
*H04K 1/00* (2006.01)
*H04N 7/16* (2011.01)

(52) U.S. Cl. ........ 713/165; 713/170; 713/187; 713/190; 726/2; 726/3; 726/5; 726/6; 726/18; 726/26; 380/255; 380/278

(58) Field of Classification Search ............... 713/165, 713/170, 190; 726/2, 3, 5, 18, 26
See application file for complete search history.

(56) References Cited

U.S. PATENT DOCUMENTS 5,050,212 A    9/1991  Dyson
(Continued)

FOREIGN PATENT DOCUMENTS

GB    2355322    4/2001

OTHER PUBLICATIONS

Supplementary European Search Report issued in EP application No. 03768536, mailed Feb. 25, 2010, 3 pages.

*Primary Examiner* — Shin-Hon Chen
(74) *Attorney, Agent, or Firm* — Fish & Richardson P.C.

(57) ABSTRACT

A tamperproof ClientID system to uniquely identify a client machine is invoked upon connection of a client application to a backend. Upon initial connection, the backend issues a unique ClientID containing a checksum. The client application prepares at least two different scrambled versions of the ClientID and stores them in respective predetermined locations on the client machine. Upon subsequent connection to the backend, the client application retrieves and unscrambles the values at the two locations, verifies the checksums and compares the values. If the checksums are both correct and the values match, the ClientID value is sent to the backend, otherwise the client application sends an error code.

21 Claims, 2 Drawing Sheets

U.S. PATENT DOCUMENTS

| | | |
|---|---|---|
| 5,199,066 A | 3/1993 | Logan |
| 6,711,682 B1 | 3/2004 | Capps |
| 6,832,316 B1 * | 12/2004 | Sibert .................. 713/181 |
| 6,971,018 B1 | 11/2005 | Witt et al. |
| 7,082,615 B1 * | 7/2006 | Ellison et al. ............ 726/26 |
| 7,213,266 B1 * | 5/2007 | Maher et a ............ 726/26 |
| 7,234,157 B2 * | 6/2007 | Childs et al. ............ 726/2 |
| 2002/0116515 A1 | 8/2002 | Hashimoto |
| 2002/0120861 A1 | 8/2002 | Kagiwada et al. |
| 2002/0197985 A1 | 12/2002 | Tourrilhes et al. |
| 2003/0046542 A1 * | 3/2003 | Chen et al. ............ 713/176 |
| 2003/0084291 A1 | 5/2003 | Yamamoto et al. |

* cited by examiner

FIXED CLIENT IDENTIFICATION SYSTEM FOR POSITIVE IDENTIFICATION OF CLIENT TO SERVER

CLAIM OF PRIORITY

This application is a continuation application and claims priority under 35 USC §120 to U.S. patent application Ser. No. 10/532,542 filed on Nov. 17, 2005, (U.S. Pat. No. 7,487,350 to be issued on Feb. 3, 2009), which claims priority to PCT Application No. PCT/US2003/033509 filed on Oct. 23, 2003, which claims priority to U.S. Provisional Application No. 60/421,285 filed on Oct. 25, 2002, the entire contents of which are hereby incorporated by reference.

TECHNICAL FIELD

This invention relates to security applications, and more particularly to identification of a user's computer.

BACKGROUND

Identification of a particular client computer system used for accessing a server is useful in secure applications where positive identification is desirable. In the past, systems for identifying client computers, browser cookies, for example, have had less than satisfactory capability of resisting tampering.

SUMMARY

A ClientID uniquely identifying a client machine is issued by the backend and stored on the client's machine upon first client application connection to the backend. On all subsequent connections, the client application retrieves the ClientID and sends it back to the backend. The ClientID mechanism includes features that make it very difficult for the user to remove or change the ClientID once it is set. In particular, according to the invention, this is accomplished by having the client application store at least two different scrambled versions of the ClientID in two separate locations in the client machine. Upon subsequent connection to the backend, the client application attempts to retrieve and unscramble the values at the two locations.

In the preferred embodiment, during the ClientID storage process, the backend generates a ClientID initially that contains a checksum and transmits it to the client application upon initial connection to the backend. The client application uses a first key to scramble the ClientID generating a first scrambled ClientID that is stored in the first predetermined location, for example the registry. A second key is used by the client application to produce a second scrambled version of the ClientID that is stored in the second predetermined location, for example the system configuration file.

Upon subsequent connection of the backend, a retrieval process is invoked in which the client application retrieves the values at each location, unscrambles them using the respective keys, tests their checksums for verification, and compares the unscrambled values. If the checksums are both correct and the unscrambled values match, the retrieved ClientID is transmitted to the backend. Otherwise, the client application sends an appropriate error code to the backend.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

ClientID is a special tag that uniquely identifies the client machine. Initially, the ClientID is generated by the backend and stored on client's machine upon first client application connection to the backend. On all subsequent connection, client application retrieves the ClientID and sends it back to the backend. Unlike browser cookies, the ClientID mechanism includes some special tamper-proof features that make it very difficult for the user to remove or change the ClientID once it is set.

Figure 1:
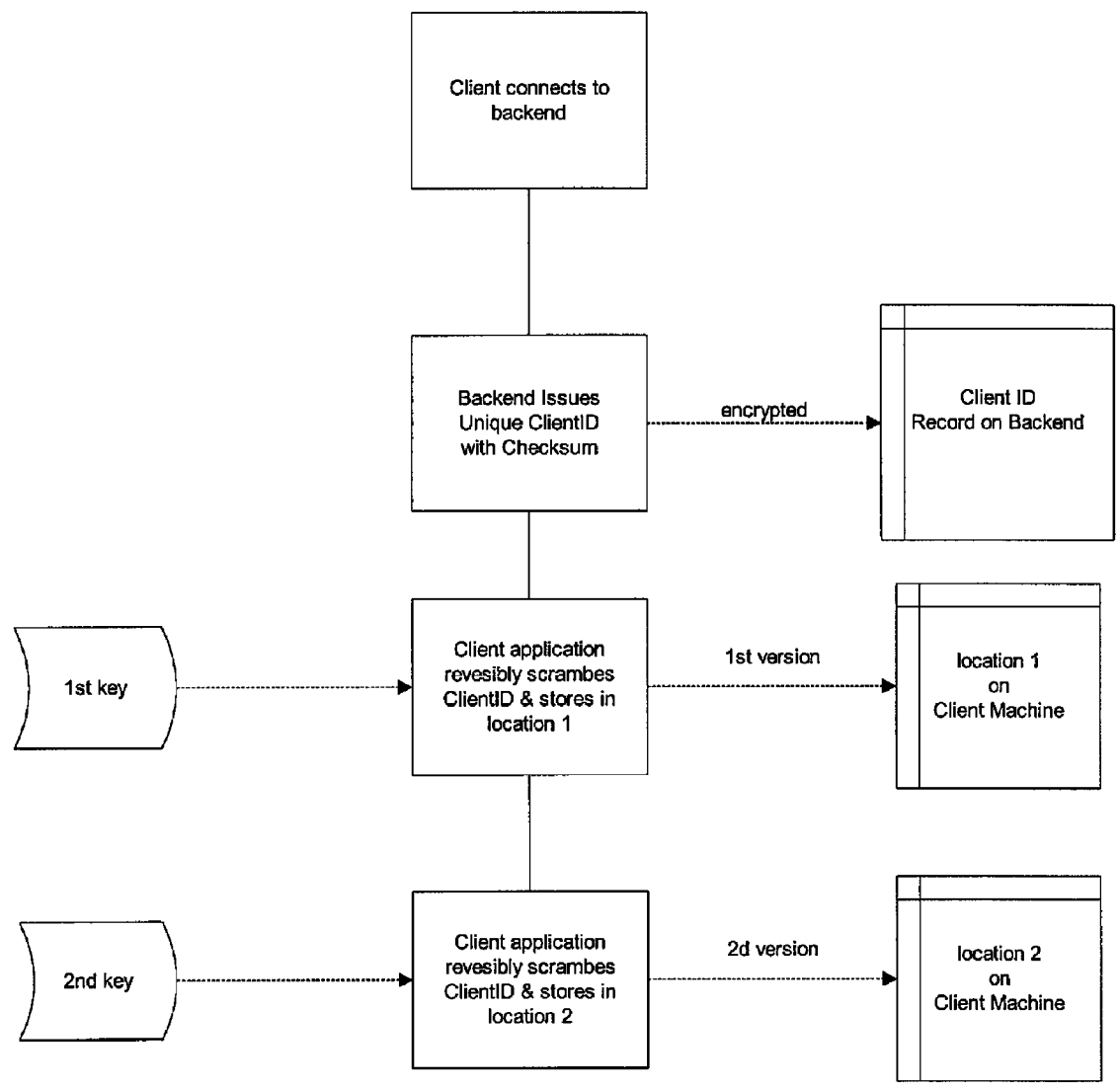
FIG. 1 is a flow and block diagram of the ClientID storage process.

Note: ClientID remains on the client's machine even after the client application is uninstalled. ClientID installation/retrieval occurs as a part of the client application startup process, as shown in FIG. 1, described in more detail below.

ClientID Storage Process

ClientID is stored in at least two undisclosed locations on the client machine (for example, in the registry and system configuration file). As shown in FIG. 1, the ClientID value is encrypted on the backend and contains a checksum. The client application has an ability to verify whether the checksum is correct. This makes ClientID tampering much more difficult. In addition, prior to storing the ClientID in these two locations, the ClientID in each location is reversibly scrambled by the client application with two different keys. This makes it impossible to find the second ClientID location even if someone learns the first location and performs a search based on a value stored in the first location.

ClientID Retrieval Process

Figure 2:
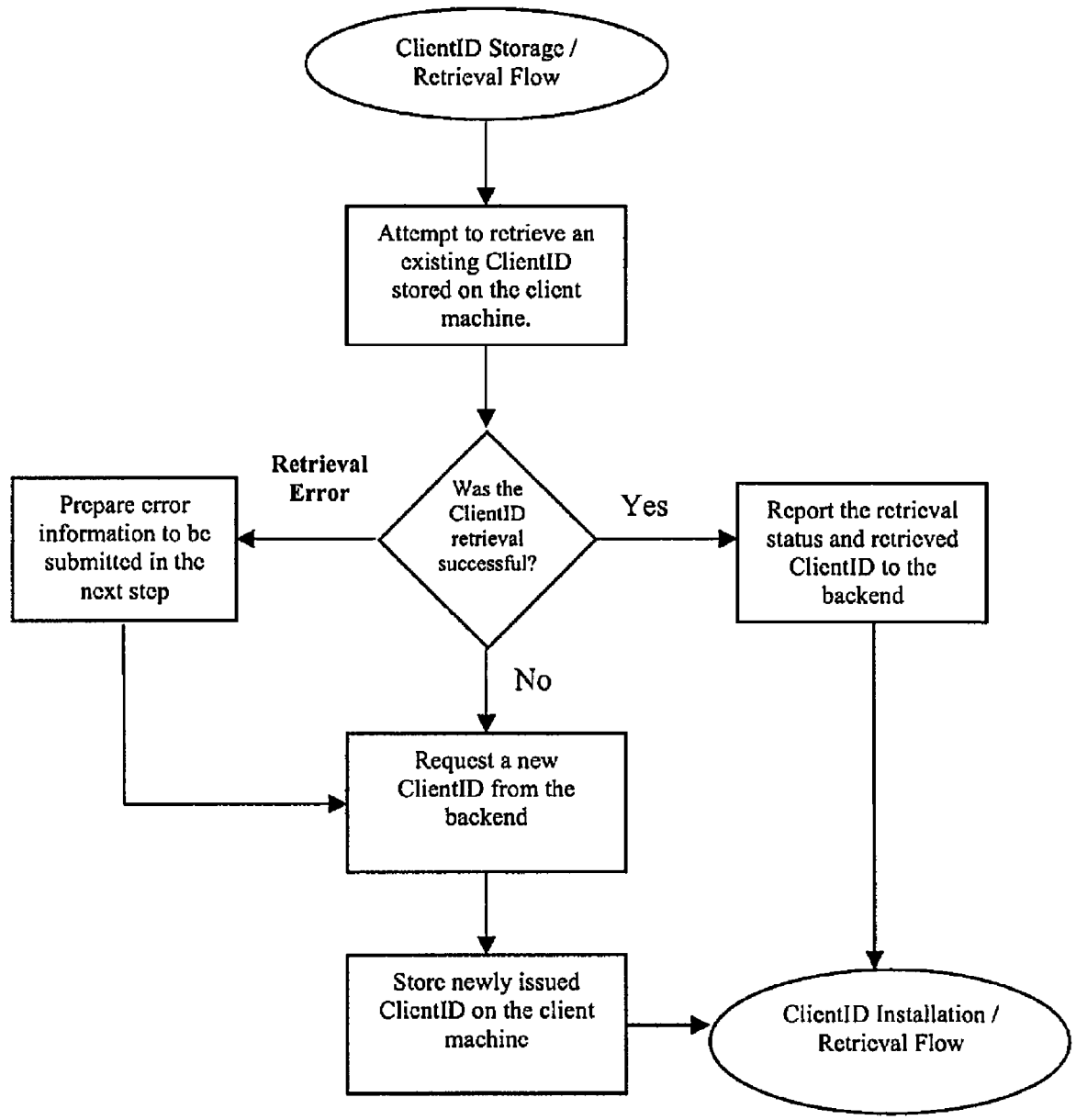
FIG. 2 is a flow diagram of the ClientID retrieval process.

In the beginning of the ClientID retrieval process shown in FIG. 2, the client application attempts to retrieve and unscramble the values stored in both locations. Then it attempts to verify and compare these two values (if any were found).

All possible retrieval outcomes are listed below. Only the first two can be considered "normal", that is, should occur as a part of regular software usage. All other cases indicate that either someone is tampering with the ClientID mechanism or an Operating System malfunction/data corruption has occurred.

a. ClientID is not found in either of the two locations. This would normally happen when the software is started for the first time on the client machine. Action: request a new ClientID from the backend.

b. ClientID is found in both locations. The two values have a correct checksum and match each other. This should happen on the second and all subsequent client application launches. Action: report retrieved ClientID value to the backend.

c. ClientID is found in only one location. The value at that location has a correct checksum. Action: report retrieved ClientID to the backend along with error code #1 (see below for details)

d. ClientID is found in both locations. Only one value has a correct checksum. Action: report retrieved ClientID from the correct location to the backend along with error code #2 and a value from the other location.

e. ClientID is found in both locations. The two values have a correct checksum but do not match each other. Action:

report retrieved ClientID value from the first location to the backend along with error code #3 and a value from the second location.

f. ClientID is found in both locations. Values from both locations fail the checksum verification. Action: request a new ClientID from the backend, report error code #4 and values from both locations.

g. ClientID is found in only one location. The value at that location fails the checksum verification. Action: request a new ClientID from the backend, report error code #5 and a value from that location.

In cases c. through g. an error code along with some optional data is reported to the backend. That information is logged on the backend and, in conjunction with other data, like user IP, can be invaluable in detecting fraudulent activity. In cases c. through e. the error code and optional data are stored in the supplied ClientID record. In cases f. and g. that information is stored in the newly generated ClientID record.

A number of embodiments of the invention have been described. Nevertheless, it will be understood that various modifications may be made without departing from the spirit and scope of the invention. For example, more than two scrambled versions can be stored in respective locations. Accordingly, other embodiments are within the scope of the following claims.

What is claimed is:

1. A method for storing data for identification comprising:
   in response to a client machine establishing a connection with a backend machine, receiving unique identifying data at the client machine from the backend machine;
   reversibly scrambling the unique identifying data to produce a first scrambled version of the unique identifying data and a second version of the unique identifying data;
   storing the first scrambled version of the unique identifying data at a first predetermined location of the client machine and the second scrambled version of the unique identifying data at a second predetermined location of the client machine, different from the first predetermined location;
   retrieving the first and second stored scrambled versions of the unique identifying data;
   unscrambling the first and second stored scrambled versions to produce a first unscrambled version and a second unscrambled version of the unique identifying data;
   comparing the first unscrambled version and second unscrambled version; and
   sending data representative of the comparison to the backend machine.

2. The method of claim 1, further comprising:
   using the comparison data and a stored version of the unique identifying data to grant access of the client machine to the backend machine.

3. The method of claim 1, wherein the retrieving the first and second stored scrambled versions of the unique identifying data is based upon the client machine establishing a subsequent connection with the backend machine.

4. The method of claim 1, wherein the data representative of the comparison sent to the backend machine includes the unique identifying data.

5. The method of claim 1, wherein the data representative of the comparison sent to the backend machine includes an error message.

6. The method of claim 1, wherein the data representative of the comparison sent to the backend machine includes a request for additional unique identifying data.

7. The method of claim 1, wherein the unique identifying data provides a unique identification for the client machine.

8. The method of claim 1, wherein the unique identifying data includes a checksum.

9. The method of claim 1, wherein the unique identifying data is encrypted by the backend machine.

10. The method of claim 1, wherein a first key is used to reversibly scramble the unique identifying data to produce the first scrambled version, and a second key, different than the first key, is used to reversibly scramble the unique identifying data to produce the second scrambled version.

11. A system comprising:
    a client machine for receiving unique identifying data from a backend machine in response to establishing a connection with the backend machine, the unique identifying data being reversibly scrambled by the client machine to produce a first scrambled version of the unique identifying data and a second version of the unique identifying data, the first scrambled version of the unique identifying data being stored at a first predetermined location of the client machine and the second scrambled version of the unique identifying data being stored at a second predetermined location of the client machine, different from the first predetermined location, wherein the client machine is further configured to unscramble the first and second stored scrambled versions of the unique identifying data to produce a first unscrambled version and a second unscrambled version of the unique identifying data, the first unscrambled version and second unscrambled version are compared, and data representative of the comparison is sent to the backend machine.

12. The system of claim 11, wherein the backend machine uses the comparison data and a stored version of the unique identifying data to grant the client machine access.

13. The system of claim 11, wherein the client machine unscrambles the first and second stored scrambled versions of the unique identifying data based upon the client machine establishing a subsequent connection with the backend machine.

14. The system of claim 11, wherein the data representative of the comparison sent to the backend machine includes the unique identifying data.

15. The system of claim 11, wherein the data representative of the comparison sent to the backend machine includes an error message.

16. The system of claim 11, wherein the data representative of the comparison sent to the backend machine includes a request for additional unique identifying data.

17. The system of claim 11, wherein the unique identifying data provides a unique identification for the client machine.

18. The system of claim 11, wherein the unique identifying data includes a checksum.

19. The system of claim 11, wherein the unique identifying data is encrypted by the backend machine.

20. The system of claim 11, wherein the client machine uses a first key to reversibly scramble the unique identifying data to produce the first scrambled version, and uses a second key, different than the first key, to reversibly scramble the unique identifying data to produce the second scrambled version.

21. A computer program product tangibly embodied in a computer storage device and comprising instructions that when executed by a processor perform a method for storing data for identification comprising:
    in response to a client machine establishing a connection with a backend machine, receiving unique identifying data at the client machine from the backend machine;

reversibly scrambling the unique identifying data to produce a first scrambled version of the unique identifying data and a second version of the unique identifying data;

storing the first scrambled version of the unique data at a first predetermined location of the client machine and the second scrambled version of the unique identifying data at a second predetermined location of the client machine, different from the first predetermined location;

retrieving the first and second stored scrambled versions of the unique identifying data;

unscrambling the first and second stored scrambled versions to produce a first unscrambled version and a second unscrambled version of the unique identifying data;

comparing the first unscrambled version and second unscrambled version; and sending data representative of the comparison to the back-end machine.

* * * * *

UNITED STATES PATENT AND TRADEMARK OFFICE
CERTIFICATE OF CORRECTION

| | | |
|---|---|---|
| PATENT NO. | : 8,001,376 B2 | Page 1 of 1 |
| APPLICATION NO. | : 12/364816 | |
| DATED | : August 16, 2011 | |
| INVENTOR(S) | : Utin | |

It is certified that error appears in the above-identified patent and that said Letters Patent is hereby corrected as shown below:

Column 5, Line 4, In Claim 21, after "unique" insert -- identifying --

Signed and Sealed this
Eleventh Day of October, 2011

David J. Kappos
*Director of the United States Patent and Trademark Office*